United States Patent
Iijima (10) Patent No.: US 9,399,980 B2
(45) Date of Patent: Jul. 26, 2016

(54) IGNITION TIMING CONTROL DEVICE OF INTERNAL COMBUSTION ENGINE

(71) Applicant: NISSAN MOTOR CO., LTD., Yokohama-shi, Kanagawa (JP)

(72) Inventor: Kazuki Iijima, Tokyo (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 169 days.

(21) Appl. No.: 14/380,998

(22) PCT Filed: Mar. 12, 2013

(86) PCT No.: PCT/JP2013/056841
§ 371 (c)(1),
(2) Date: Aug. 26, 2014

(87) PCT Pub. No.: WO2013/141088
PCT Pub. Date: Sep. 26, 2013

(65) Prior Publication Data
US 2015/0059697 A1    Mar. 5, 2015

(30) Foreign Application Priority Data

Mar. 19, 2012    (JP) .................................. 2012-061326

(51) Int. Cl.
*F02D 41/02*    (2006.01)
*F02P 5/15*    (2006.01)
(Continued)

(52) U.S. Cl.
CPC ................. *F02P 5/14* (2013.01); *F01N 3/2006* (2013.01); *F02D 41/024* (2013.01); *F02P 5/1506* (2013.01); *F02P 5/1508* (2013.01);
(Continued)

(58) Field of Classification Search
CPC ......... Y02T 10/26; Y02T 10/46; Y02T 10/54; B60W 20/16; F02D 41/024; F02D 41/0255; F02D 2013/0292; F02D 41/068; F02D 41/064; F02D 37/02; F02P 5/1506; F02P 5/1508; F01N 3/2006
See application file for complete search history.

(56) References Cited

U.S. PATENT DOCUMENTS

| 5,390,491 | A | * | 2/1995 | Suzumura | ............. F01N 11/007 123/686 |
| 2001/0027643 | A1 | * | 10/2001 | Tokuyasu | ............. F02B 17/005 60/284 |
| 2004/0055283 | A1 | * | 3/2004 | Iihoshi | .................... F01P 7/164 60/284 |

(Continued)

FOREIGN PATENT DOCUMENTS

| JP | 07-083148 | 3/1995 |
| JP | 08-291709 | 11/1996 |

(Continued)

*Primary Examiner* — Sizo Vilakazi
(74) *Attorney, Agent, or Firm* — Drinker Biddle & Reath LLP (57) ABSTRACT

A water temperature indicated at a startup timing of an engine is stored as a startup-timing water temperature. During an idling state generated after a cold start, a retard amount (S) is calculated based on the startup-timing water temperature. At this time, the retard amount (S) is set at a larger level as the startup-timing water temperature becomes higher. However, in a case that the startup-timing water temperature is higher than a predetermined temperature, the retard amount (S) is set at a smaller level as the startup-timing water temperature becomes higher. A retard amount (R) is calculated based on a current water temperature in the same manner as the retard amount (S). A smaller one is selected from the retard amount (S) and the retard amount (R), as a basic retard amount.

6 Claims, 4 Drawing Sheets

(51) Int. Cl.
 *F02P 5/14* (2006.01)
 *F01N 3/20* (2006.01)
(52) U.S. Cl.
 CPC ....... *F01N2410/06* (2013.01); *F02D 2200/021* (2013.01); *Y02T 10/26* (2013.01); *Y02T 10/46* (2013.01)

(56) References Cited

U.S. PATENT DOCUMENTS

2005/0197759 A1\* 9/2005 Surnilla ................ F02P 5/1504
 701/103
2007/0084425 A1\* 4/2007 Hirose .................... F01L 1/344
 123/90.1
2010/0251996 A1\* 10/2010 Akimoto ................ B60K 6/445
 123/406.23

FOREIGN PATENT DOCUMENTS

| | | |
|---|---|---|
| JP | 2004-116372 A | 4/2004 |
| JP | 2008-255875 A | 10/2008 |
| JP | 2009-214704 A | 9/2009 |
| JP | 2010-185433 | 8/2010 |

\* cited by examiner

IGNITION TIMING CONTROL DEVICE OF INTERNAL COMBUSTION ENGINE

TECHNICAL FIELD

The present invention relates to an ignition timing control device of an internal combustion engine, and more particularly to a technique of correcting an ignition timing to retard side (retard-angle side) in order to attain a quick activation of catalyst during an idling generated after a cold start of the internal combustion engine.

BACKGROUND ART

Some technology is known in which the ignition timing is corrected toward the retard side so as to increase an exhaust gas temperature and thereby promote an activation of catalyst during an idling operation after a cold start of an internal combustion engine. For example, in Patent Literature 1, retard amount and retard-correcting period for the ignition timing are set based on a temperature of cooling water during the idling operation generated after the cold start. Specifically, in order to promote temperature rise of the exhaust gas, the retard amount is set at a larger value as an engine-start-time temperature of the cooling water becomes lower. Moreover, the retard-correcting period is set at a larger value as the engine-start-time temperature of the cooling water becomes lower.

CITATION LIST

Patent Literature

Patent Literature 1: Japanese Patent Application Publication No. 2004-116372, FIGS. 3-7, paragraphs [0039]-[0045] etc.

SUMMARY OF THE INVENTION

Problem to be Solved

However, in the case that the retard amount and the retard-correcting period are more enlarged as the engine-start-time temperature of the cooling water becomes lower as mentioned above, a combustion stability is worsened if the engine-start-time temperature of the cooling water is very low, for example, at the time of very-low-temperature startup of the engine. This is because the retard amount and the retard-correcting period are set at large values although the combustion is not yet stable. As a result, there is a risk that a drivability is worsened due to a generation of idle roughness. On the other hand, if the engine-start-time temperature of the cooling water is relatively high, i.e. if the engine-start-time temperature of the cooling water is near an activating temperature of the catalyst, the retard amount and the retard-correcting period can be set at large values because the combustion is relatively stable. However, in this situation, there is a possibility that the retard amount and the retard-correcting period are set at small values so that a sufficient effect of temperature rise of exhaust gas is not obtained.

It is therefore an object of the present invention to provide an ignition timing control device of an internal combustion engine, devised to promote a temperature rise of exhaust gas by a retard correction of the ignition timing and to improve an exhaust performance by virtue of quick activation of the catalyst while securing combustion stability and favorable drivability.

Solution to Problem

According to the present invention, there is provided an ignition timing control device of an internal combustion engine, comprising: an ignition device configured to ignite air-fuel mixture of a combustion chamber of the internal combustion engine; a catalyst interposed in an exhaust passage of the internal combustion engine and configured to purify an exhaust gas flowing in the exhaust passage; a water temperature detecting means configured to detect a water temperature of a cooling water of the internal combustion engine; an ignition-timing retarding means configured to correct an ignition timing of the ignition device to a retard side such that an activation of the catalyst is promoted, during an idling operation generated after a cold start of the internal combustion engine; and a startup-timing-water-temperature retard-amount calculating means configured to calculate a retard amount by which the ignition-timing retarding means retards the ignition timing, based on a startup-timing water temperature which is the water temperature indicated at a startup timing of the internal combustion engine, wherein the startup-timing-water-temperature retard-amount calculating means is configured to set the retard amount at a larger level as the startup-timing water temperature becomes higher, in a case that the startup-timing water temperature is lower than or equal to a predetermined temperature, and to set the retard amount at a smaller level as the startup-timing water temperature becomes higher, in a case that the startup-timing water temperature is higher than the predetermined temperature. That is, according to the present invention, the retard amount takes its maximum value when the startup-timing water temperature is equal to the predetermined temperature. The retard amount takes a smaller value as a difference between the startup-timing water temperature and the predetermined temperature becomes larger.

As mentioned above, in the case that the startup-timing water temperature is lower than or equal to the predetermined temperature, the retard amount is set at a larger level as the startup-timing water temperature becomes higher, i.e. the retard amount is set at a smaller level as the startup-timing water temperature becomes lower. Accordingly, if the startup-timing water temperature is very low, for example, at the time of very-low-temperature startup of the engine, the retard amount is set at a small value. Hence, the worsening of combustion stability is suppressed to ensure initial drivability, so that the idle roughness can be inhibited from occurring.

Moreover, because the combustion is stable in a situation that the startup-timing water temperature is around the predetermined temperature, a sufficiently large retard amount is set. Hence, the temperature rise of exhaust gas is promoted to early activate the catalyst, so that the exhaust performance can be enhanced.

On the other hand, in a situation that the startup-timing water temperature is higher than the predetermined temperature, the retard amount is set at a smaller level as the startup-timing water temperature becomes higher i.e. comes closer to the activating temperature of the catalyst. Hence, the retard amount is inhibited from being excessively large so that the worsening of drivability and the worsening of fuel economy can be suppressed.

Effects of Invention

According to the present invention, by properly adjusting the retard amount of the ignition timing in accordance with the startup-timing water temperature, the temperature rise of exhaust gas is promoted to improve the exhaust emission performance by virtue of the quick activation of catalyst while ensuring the combustion stability and favorable drivability.

DETAILED DESCRIPTION OF INVENTION

Figure 1:
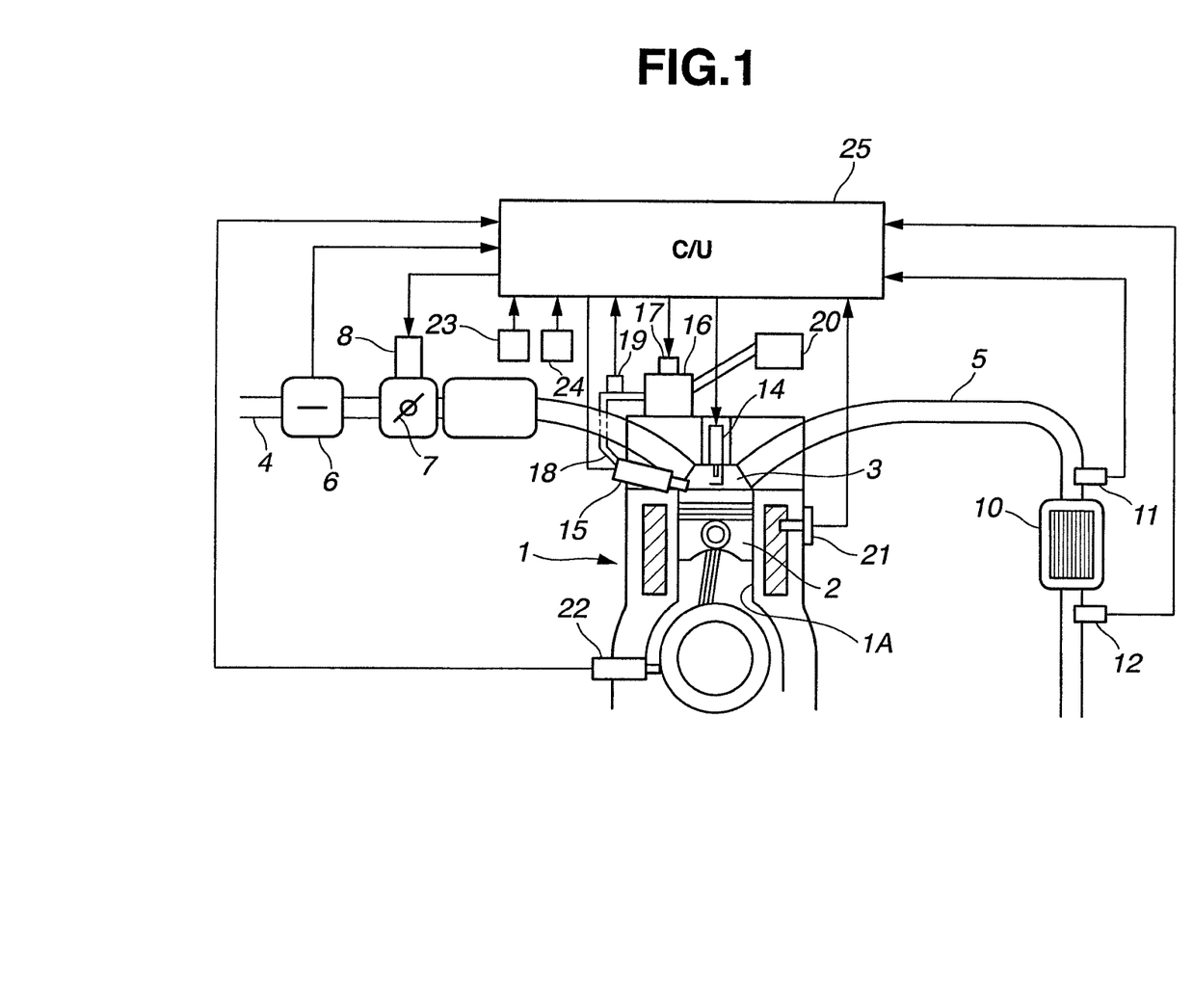
[FIG. 1] A system configuration view of an internal combustion engine to which an ignition timing control device according to an embodiment of the present invention is applied.

Hereinafter, the present invention will be explained based on embodiments referring to the drawings. FIG. 1 is an explanatory view showing a system configuration of an in-cylinder-direct-injection-type spark-ignition internal combustion engine to which one embodiment of the present invention is applied.

A piston 2 is disposed in a cylinder 1A of the internal combustion engine 1 such that the piston 2 is able to reciprocate inside the cylinder. A combustion chamber 3 formed above the piston 2 communicates (is connected) through an intake valve (not shown) with an intake passage 4. Also, the combustion chamber 3 communicates (is connected) through an exhaust valve (not shown) with an exhaust passage 5. An air flow meter 6 for detecting an intake air flow volume (intake-air amount) is provided in the intake passage 4. Moreover, an electronically-controlled throttle valve 7 is provided in the intake passage 4. An opening degree of the electronically-controlled throttle valve 7 is controlled through an actuator 8 by control signals. A catalytic converter 10 for purifying exhaust emission is provided in the exhaust passage 5. Moreover, two air-fuel ratio sensors 11 and 12 are provided respectively upstream and downstream of the catalytic converter 10.

A spark plug 14 which functions as an ignition device is provided at a top center portion of the combustion chamber 3. Moreover, a fuel injection valve 15 which injects fuel directly into the combustion chamber 3 is disposed at a lateral portion of the combustion chamber 3 on the side of the intake passage 4. Fuel whose pressure is adjusted to a given pressure by a high-pressure fuel pump 16 and a pressure regulator 17 is supplied through a high-pressure fuel passage 18 to the fuel injection valve 15. Accordingly, when the fuel injection valve 15 of each cylinder opens by a control pulse, fuel whose amount is according to an open period of the fuel injection valve 15 is injected. A reference sign 19 denotes a fuel pressure sensor for detecting fuel pressure, and a reference sign 20 denotes a low-pressure fuel pump for feeding fuel to the high-pressure fuel pump 16.

It is noted that the structure according to the present invention is not limited to the in-cylinder-direct-injection type, and may instead have a port-injection type in which fuel is injected into an intake port.

The internal combustion engine 1 includes a water temperature sensor 21, an oil temperature sensor 24 and a crank angle sensor 22. The water temperature sensor 21 detects a temperature of engine cooling water, as a water temperature detecting means (or section). The oil temperature sensor 24 detects a temperature of engine hydraulic oil. The crank angle sensor 22 detects a crank angle. Moreover, an accelerator opening-angle sensor 23 is provided which detects a depressed amount (i.e. position) of an accelerator pedal by a driver.

Fuel injection quantity, fuel injection timing, ignition timing and the like of the internal combustion engine 1 are controlled by a control unit 25. The control unit 25 receives detection signals (input signals) of the above-mentioned various sensors. According to an engine operating condition given by these input signals, the control unit 25 determines whether a combustion mode should be a homogeneous combustion or a stratified-charge combustion, i.e., selects one from the homogeneous combustion and the stratified-charge combustion as the combustion mode. In conformity with the selected combustion mode, the control unit 25 controls the opening angle of the electronically-controlled throttle valve 7, the fuel injection timing and fuel injection quantity of the fuel injection valve 15, the ignition timing of the spark plug 14, and the like.

Figure 2:
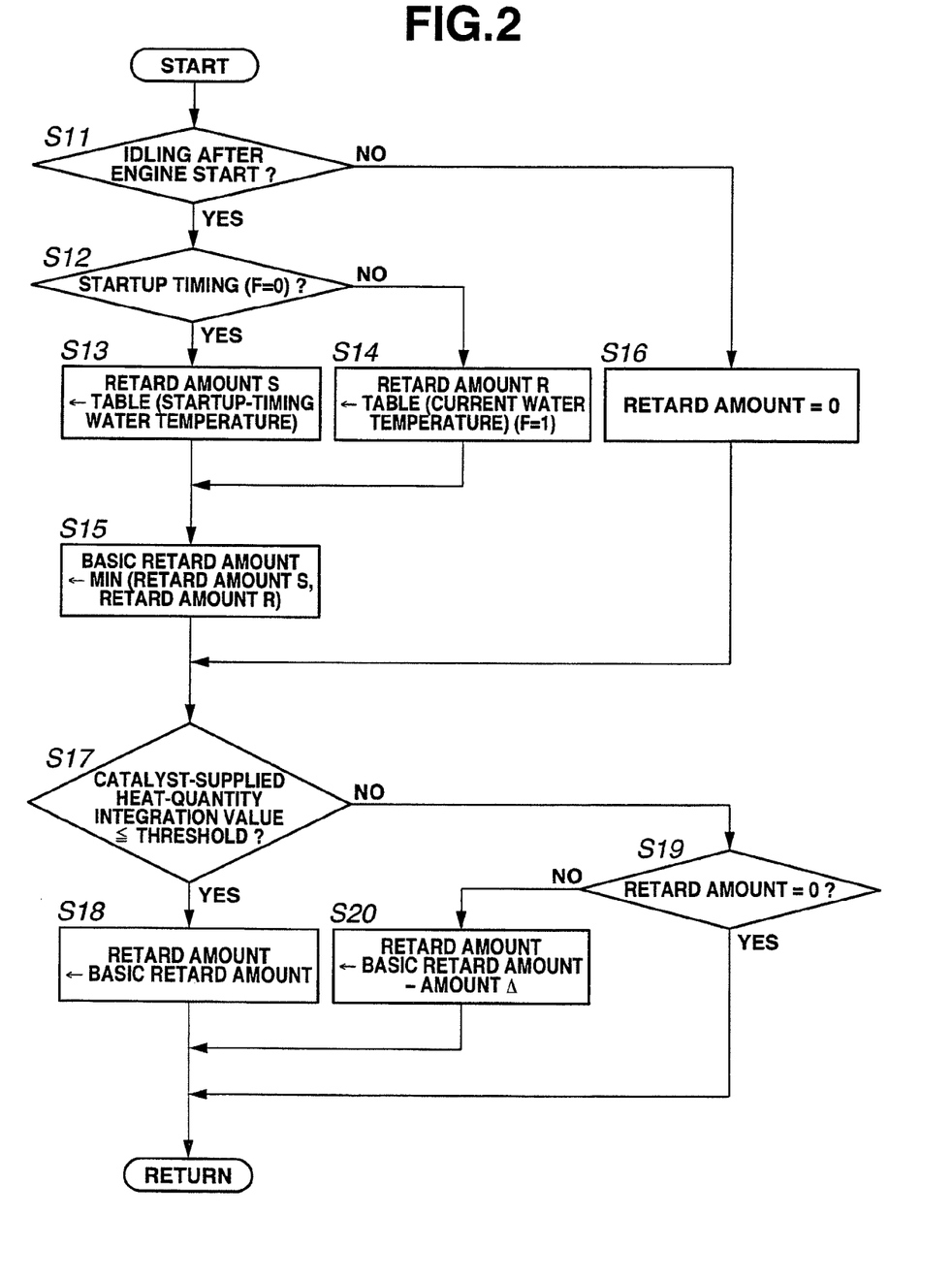
[FIG. 2] A flowchart illustrating a control flow of a retard correction for ignition timing.

In this embodiment, a retard correction (lag-angle correction) for the ignition timing is performed to promote a rise of exhaust gas temperature and a rise of catalyst temperature, under an idling state which occurs immediately after a cold start of the internal combustion engine 1. This is because a quick activation of the catalytic converter 10 is required in such an idling state. FIG. 2 is a flowchart showing a control flow of the retard correction for the ignition timing under an idling state which occurs immediately after the cold start. The control unit 25 has already stored the routine of this control flow. This routine is repeatedly executed at predetermined intervals (for example, every 10 milliseconds).

At step S11, it is judged whether or not a current engine state is the idling state generated (immediately) after the cold start of the internal combustion engine, on the basis of the detection signal of the water temperature sensor 21 and the like. If the current engine state is not the idling state generated after the cold start, the program proceeds to step S16. At step S16, a retard amount (lag amount) of the ignition timing is set at zero. More specifically, a retard amount which is used in the retard correction for the ignition timing at the time of the idling state generated immediately after the cold start is set at zero. Then, the program proceeds to an after-mentioned step S17.

If the current engine state is the idling state generated immediately after the cold start, the program proceeds from step S11 to step S12. At step S12, it is judged whether or not a current moment is a startup timing (i.e., a first-time routine immediately after the cold start) of the engine, for example by using a start-up flag F which is set at zero at the time of deactivation (stop) of the engine. If the start-up flag F takes "0" at step S12, it is determined that the current moment is the startup timing of the engine. Then, the start-up flag F is set at "1", and the program proceeds to step S13. At step S13, a retard amount S of the ignition timing is calculated based on a water temperature value sensed by the water temperature sensor 21, i.e., based on a water temperature value indicated at the startup timing of the engine (hereinafter called "startup-timing water temperature"). Then, the calculated retard amount S is memorized and stored in a storage device such as a RAM included in the control unit 25. That is, the program proceeds from step S12 to step S13 only once at the startup timing of the engine, in order to calculate and store the retard amount S based on the startup-timing water temperature.

If the current moment is not the startup timing of the engine, namely if the start-up flag F takes "1"; the program proceeds from step S12 to step S14. At step S14, a retard amount R of the ignition timing is calculated based on a current water temperature value (hereinafter called "current water temperature") sensed by the water temperature sensor 21. The calculations of the retard amount S and the retard amount R will be explained later referring to FIGS. 3 and 4.

At step S15, a smaller one of the retard amount S calculated based on the startup-timing water temperature and the retard amount R calculated based on the current water temperature (i.e. the retard amount S or the retard amount R, whichever is smaller) is selected as a basic retard amount. By this basic retard amount, the ignition timing is corrected toward a retard side at the time of the idling state generated after the cold start.

Figure 4:
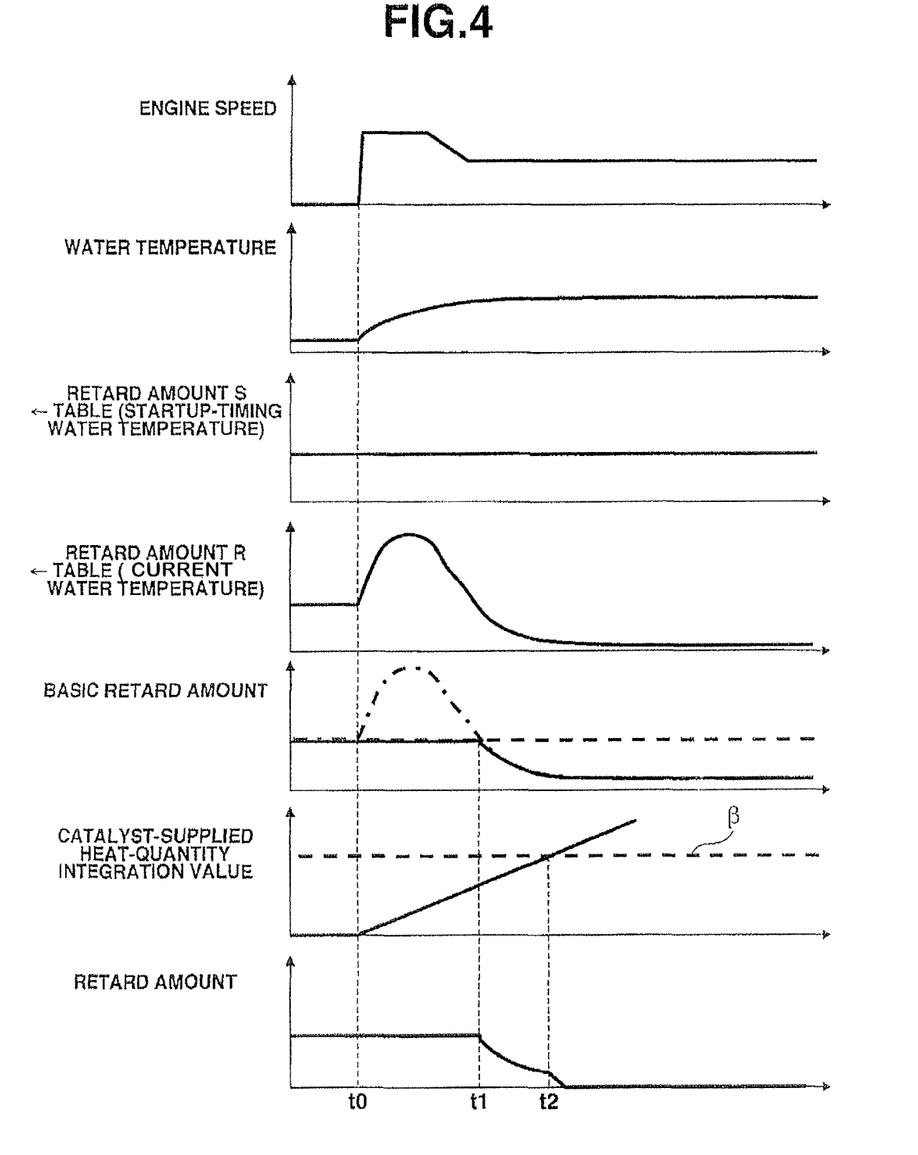
[FIG. 4] A timing chart illustrating a driving situation of transfer from a cold start to an idling state in the case that the embodiment is applied to the internal combustion engine.

At step S17, it is judged whether or not an integration value of a catalyst-supplied heat quantity (i.e. a heat quantity supplied to the catalyst) is smaller than or equal to a predetermined threshold value * (see FIG. 4). The integration value of the catalyst-supplied heat quantity is calculated in view of the intake-air amount detected by the air flow meter 6, an engine load, a driving condition and the like.

If the integration value of the catalyst-supplied heat quantity is smaller than or equal to the threshold value, it is determined that the catalytic converter 10 is in an inactive state. Then, the program proceeds to step S18. At step S18, the retard correction of the ignition timing is carried out by using the basic retard amount calculated at step S15 as the (actual) retard amount. However, in the case that the current engine state is not the idling state generated after the cold start, the retard correction is not carried out because the retard amount has been set at zero at step S16.

If the integration value of the catalyst-supplied heat quantity is larger than the threshold value *, it is determined that the catalytic converter 10 is in an active state. Then, the program proceeds to steps S19 and S20 so that the retard correction is terminated. In this regard, the (actual) retard amount is gradually reduced at a certain rate when terminating the retard correction. Specifically, the retard amount is repeatedly reduced by a predetermined amount @ at step S20 until the judgment process of step S19 determines that the retard amount is equal to zero.

Figure 3:
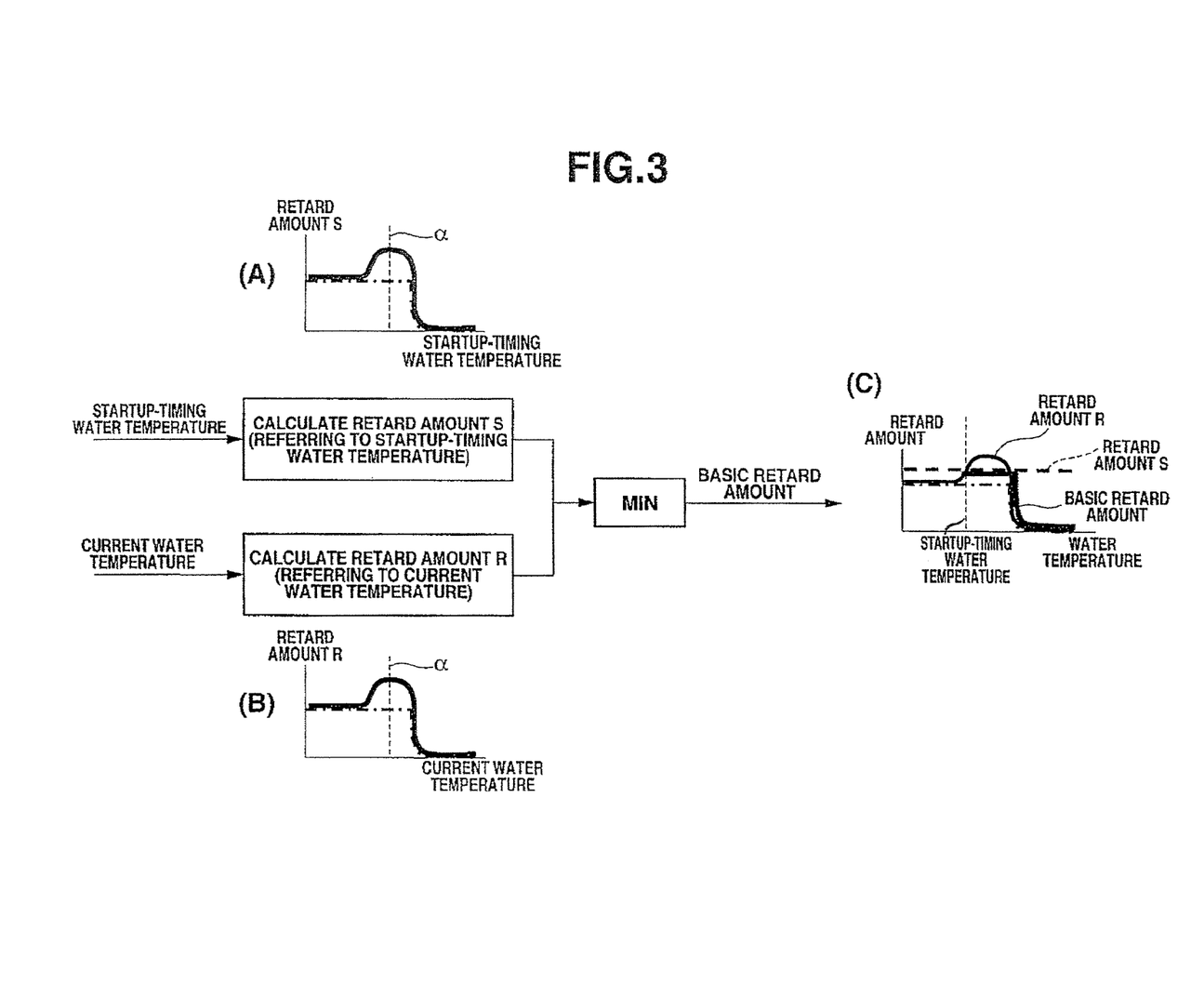
[FIG. 3] A functional block diagram illustrating a calculation process of a retard amount.

FIG. 3 is a functional block diagram showing control contents of steps S13 to S15. As shown in FIG. 3(A), the retard amount S is set at a larger value as the startup-timing water temperature becomes higher in the case that the startup-timing water temperature is lower than or equal to a predetermined temperature □. That is, in this case, the retard amount S is calculated as a value enlarged with the enlargement of the startup-timing water temperature. On the other hand, in the case that the startup-timing water temperature is higher than the predetermined temperature □, the retard amount S is set at a smaller value as the startup-timing water temperature becomes higher. That is, in this case, the retard amount S is calculated as a value lowered with the enlargement of the startup-timing water temperature. Accordingly, the retard amount S takes its maximum value when the startup-timing water temperature is near the predetermined temperature □, and the retard amount S becomes smaller as the startup-timing water temperature is farther from the predetermined temperature □.

Moreover, as shown in FIG. 3(B), a relation profile between the retard amount R and the current water temperature which is used when calculating the retard amount R by use of the current water temperature is the same as a relation profile between the retard amount S and the startup-timing water temperature which is used when calculating the retard amount S by use of the startup-timing water temperature. That is, as shown in FIGS. 3(A) and 3(B), the retard amount S and the retard amount R are respectively obtained by using an identical control map (or control table). Hence, in the same manner as the retard amount S, the retard amount R is set at a larger value as the current water temperature becomes higher in the case that the current water temperature is lower than or equal to the predetermined temperature □. That is, in this case, the retard amount R is calculated as a value enlarged with the enlargement of the current water temperature. On the other hand, in the case that the current water temperature is higher than the predetermined temperature the retard amount R is set at a smaller value as the current water temperature becomes higher. That is, in this case, the retard amount R is calculated as a value lowered with the enlargement of the current water temperature. Accordingly, the retard amount R takes its maximum value when the current water temperature is near the predetermined temperature □, and the retard amount R becomes smaller as the current water temperature is farther from the predetermined temperature □.

Moreover, as shown in FIG. 3(C), smaller one is selected from the retard amount S and the retard amount R which have been individually calculated, as the basic retard amount.

FIG. 4 is a timing chart showing a driving situation of transfer from the cold start to the idling state, in a case that such a control of the embodiment is applied.

In an interval from a cold-start timing t0 to a timing t1, the retard correction is carried out by using the retard amount S as the basic retard amount because the retard amount S obtained from the startup-timing water temperature is lower than the retard amount R obtained from the current water temperature. Next, on and after the timing t1, the retard amount R obtained from the current water temperature is lower than the retard amount S obtained from the startup-timing water temperature. Hence, the retard correction is carried out by using the retard amount R as the basic retard amount. As a result, the (actual) retard amount is gradually reduced in an interval between the timing t1 and a timing t2.

Then, the integration value of the catalyst-supplied heat quantity reaches the predetermined threshold value * at the timing t2 (see FIG. 4). From the timing t2, the above-mentioned terminating process of the retard correction of steps S19 and S20 is carried out so that the (actual) retard amount is gradually reduced toward zero at the certain rate (by the predetermined amount @).

For the purpose of simplification, according to the present invention, the (actual) retard amount may be calculated by using only the retard amount S obtained from the startup-timing water temperature, without using the retard amount R obtained from the current water temperature. That is, the retard amount may be calculated by omitting the process of steps S14 and S15 in FIG. 2.

Representative configurations and advantageous effects according to the above embodiment will now be listed and explained.

[1] The retard amount S which is obtainable from the startup-timing water temperature is set at a larger level as the startup-timing water temperature becomes higher, in the case that the startup-timing water temperature is lower than or equal to the predetermined temperature □. On the other hand, this retard amount S is set at a smaller level as the startup-timing water temperature becomes higher, in the case that the startup-timing water temperature is higher than the predetermined temperature □. Therefore, if the startup-timing water temperature is lower than or equal to the predetermined temperature □, for example, in a case of very-low-temperature startup of the engine, the worsening of combustion stability is suppressed to secure favorable drivability so that an idle roughness can be inhibited from worsening the drivability, because the retard amount is more reduced as the startup-timing water temperature is lower.

Moreover, if the startup-timing water temperature is near the predetermined temperature □, the combustion is stable. Hence, the retard amount is set at a large value so that the quick activation of the catalyst is promoted to improve the exhaust emission performance.

Moreover, if the startup-timing water temperature is higher than the predetermined temperature □, i.e. if the startup-timing water temperature is near an activating temperature of the catalyst (a temperature value for causing catalyst activation), an excessive retard amount can be inhibited from worsening the drivability, because the retard amount is more reduced as the startup-timing water temperature is higher.

As explained above, according to this embodiment, both of the securement of drivability and the improvement of exhaust emission performance produced by the promotion in temperature rise of exhaust gas are attained by properly adjusting the retard amount in accordance with the startup-timing water temperature. Moreover, because the retard amount is set based on the startup-timing water temperature, the control can be simplified, and the retard amount is not set at an excessively large value with the rise of the current water temperature. Hence, the worsening of drivability by the excessive retard amount given according to the current water temperature is not incurred.

[2] A smaller one is selected from the retard amount S calculated according to the startup-timing water temperature and the retard amount R calculated according to the current water temperature, as the basic retard amount. Accordingly, as shown by the range from the timing t1 to the timing t2 of FIG. 4, when the current water temperature continues to rise in excess of the predetermined temperature □, i.e. when the current water temperature approaches the catalyst-activating temperature, the basic retard amount continues to decrease with the rise of the current water temperature. Hence, an excessive retard amount is inhibited from being applied, so that the worsening of drivability and a worsening of fuel economy can be suppressed.

[3] As an example which realizes the effects mentioned in the above item [2], the retard amount R is set at a larger level as the current water temperature becomes higher, in the case that the current water temperature is lower than or equal to the predetermined temperature □. On the other hand, in the case that the current water temperature is higher than the predetermined temperature □, the retard amount R is set at a smaller level as the current water temperature becomes higher.

[4] The relation profile between the startup-timing water temperature and the retard amount S is identical with the relation profile between the current water temperature and the retard amount R. Accordingly, the control map (table) as shown in FIG. 3(A) or 3(B) can be shared for the calculations of the retard amount S and the retard amount R. That is, only one relation profile is preset which can attain both of the favorable exhaust emission performance and the securement of drivability. Therefore, memory usage and computing load can be reduced.

[5] The integration value of heat quantity supplied to the catalytic converter 10 is calculated in consideration of the intake-air amount, the engine load, the driving condition and the like. The retard correction of the ignition timing is finished when this integration value reaches the predetermined threshold value *, because it is determined that the catalyst has just been activated at this time. Accordingly, only a heat quantity necessary for the activation of the catalyst can be supplied to the catalyst while unnecessary retard (angle) of the ignition timing can be suppressed. Hence, as compared with a case that the retard of ignition timing is continued also after the activation of catalyst, unnecessary worsening of the drivability due to the continued retard of ignition timing can be prevented without reducing the exhaust emission performance. Moreover, because a period for which the retard correction continues is not elongated unnecessarily, an extra fuel increase for compensating for output-power reduction is unnecessary. As a result, the fuel economy is improved.

[6] Moreover, when the retard correction of the ignition timing is finished, the retard amount continues to be reduced at a certain rate (by the predetermined amount @). Accordingly, a generation of shock due to rapid change of the ignition timing can be suppressed, and the retard amount is inhibited from being set at an excessively large value around the timing of catalyst activation.

What is claimed is:

1. An ignition timing control device of an internal combustion engine, comprising:
    an ignition device configured to ignite air-fuel mixture of a combustion chamber of the internal combustion engine;
    a catalyst interposed in an exhaust passage of the internal combustion engine and configured to purify an exhaust gas flowing in the exhaust passage;
    a water temperature detecting section configured to detect a water temperature of a cooling water of the internal combustion engine;
    an ignition-timing retarding section configured to correct an ignition timing of the ignition device to a retard side such that an activation of the catalyst is promoted, during an idling operation generated after a cold start of the internal combustion engine; and
    a startup-timing-water-temperature retard-amount calculating section configured to calculate a retard amount by which the ignition-timing retarding section retards the ignition timing, based on a startup-timing water temperature which is the water temperature indicated at a startup timing of the internal combustion engine,
    wherein the startup-timing-water-temperature retard-amount calculating section is configured
        to set the retard amount at a larger level as the startup-timing water temperature becomes higher, in a case that the startup-timing water temperature is lower than or equal to a predetermined temperature which is lower than at least an activating temperature of the catalyst, and
        to set the retard amount at a smaller level as the startup-timing water temperature becomes higher, in a case that the startup-timing water temperature is higher than the predetermined temperature.

2. The ignition timing control device according to claim 1, further comprising:
    a current-water-temperature retard-amount calculating section configured to calculate another retard amount based on a current water temperature detected by the water temperature detecting section; and
    a retard-amount selecting section configured to select a smaller one of the retard amount calculated by the startup-timing-water-temperature retard-amount calculating section and the another retard amount calculated by the current-water-temperature retard-amount calculating section, as an actual retard amount by which the ignition-timing retarding section retards the ignition timing.

3. The ignition timing control device according to claim 2, wherein the current-water-temperature retard-amount calculating section is configured to set the another retard amount at a larger level as the current water temperature becomes higher, in a case that the current water temperature is lower than or equal to the predetermined temperature, and to set the another retard amount at a smaller level as the current water temperature becomes higher, in a case that the current water temperature is higher than the predetermined temperature.

4. The ignition timing control device according to claim 2, wherein a relation profile between the startup-timing water temperature and the retard amount which is used by the startup-timing-water-temperature retard-amount calculating section is the same as a relation profile between the current water temperature and the another retard amount which is used by the current-water-temperature retard-amount calculating section.

5. The ignition timing control device according of claim 1, wherein the ignition-timing retarding section is configured to finish correcting the ignition timing to the retard side when a calculated integration value of a heat quantity supplied to the catalyst reaches a predetermined threshold value.

6. The ignition timing control device according to claim 5, wherein the retard amount is gradually reduced at a certain rate when the ignition-timing retarding section finishes correcting the ignition timing to the retard side.

* * * * *